US012768509B2

(12) United States Patent
Lang et al.

(10) Patent No.: US 12,768,509 B2
(45) Date of Patent: Oct. 20, 2026

(54) ILLUMINATION APPARATUS FOR A MOTOR VEHICLE

(71) Applicant: Bayerische Motoren Werke Aktiengesellschaft, Munich (DE)

(72) Inventors: Andreas Lang, Groebenzell (DE); Martin Riedner, Munich (DE); Bernd Veihelmann, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/856,670

(22) PCT Filed: Jun. 20, 2023

(86) PCT No.: PCT/EP2023/066596
§ 371 (c)(1),
(2) Date: Oct. 14, 2024

(87) PCT Pub. No.: WO2024/008437
PCT Pub. Date: Jan. 11, 2024

(65) Prior Publication Data
US 2025/0243982 A1 Jul. 31, 2025

(30) Foreign Application Priority Data
Jul. 7, 2022 (DE) ..................... 10 2022 116 920.0

(51) Int. Cl.
*F21S 41/155* (2018.01)
*F21S 41/20* (2018.01)
*F21S 41/24* (2018.01)

(52) U.S. Cl.
CPC ............ *F21S 41/155* (2018.01); *F21S 41/24* (2018.01); *F21S 41/2805* (2024.05)

(58) Field of Classification Search
CPC ...... F21S 41/265; F21S 41/275; F21S 43/402; F21S 43/245; F21S 43/2643;
(Continued)

(56) References Cited

U.S. PATENT DOCUMENTS 5,949,346 A * 9/1999 Suzuki ..................... B60Q 3/14 116/288
2004/0013904 A1 1/2004 Cina
(Continued)

FOREIGN PATENT DOCUMENTS

DE 10 2015 204 303 A1 9/2015
DE 20 2021 104 561 U1 10/2021
(Continued)

OTHER PUBLICATIONS

Search English translation of JP 2013193062 A (Year: 2013).*
(Continued)

*Primary Examiner* — Omar Rojas Cadima
(74) *Attorney, Agent, or Firm* — Crowell & Moring LLP

(57) ABSTRACT

An illumination apparatus for a motor vehicle includes a housing which is covered by an outer cover glass and has a surface illumination function in order to illuminate a predefined region of the surface of the outer cover glass when viewed from above from the outside onto the outer cover glass. An illuminant is provided at least in sections at the edge of the outer cover glass, and the outer cover glass includes a translucent light-guiding layer into which the illuminant radiates light along the planar extent of the light-guiding layer during operation. The light-guiding layer transmits the irradiated light along the planar extent, and a light-deflecting device is provided in the predefined region of the outer cover glass in order to deflect transmitted light in the light-guiding layer such that it emerges via the outer cover glass.

20 Claims, 5 Drawing Sheets

(58) Field of Classification Search
CPC ... F21S 43/26411; B60Q 1/28; B60Q 1/0058; B60Q 1/0041; B60Q 1/0047; B60Q 1/0052; B60Q 1/0011; B60Q 1/381; F21W 2103/10; F21W 2102/13; F21W 2103/20; F21W 2103/55; F21W 2104/00
See application file for complete search history.

(56) References Cited

U.S. PATENT DOCUMENTS

| | | | | |
|---|---|---|---|---|
| 2016/0377254 | A1 | 12/2016 | Thiel et al. | |
| 2017/0349094 | A1* | 12/2017 | Salter | B60Q 1/00 |
| 2018/0031197 | A1 | 2/2018 | Kratoska | |

FOREIGN PATENT DOCUMENTS

| | | | |
|---|---|---|---|
| EP | 2 777 988 | A1 | 9/2014 |
| JP | 2005-82036 | A | 3/2005 |
| JP | 2010-137758 | A | 6/2010 |
| JP | 2012-64533 | A | 3/2012 |
| JP | 2013193062 | A * | 9/2013 |
| WO | WO 2021/180168 | A1 | 9/2021 |

OTHER PUBLICATIONS

International Search Report (PCT/ISA/210) issued in PCT Application No. PCT/EP2023/066596 dated Aug. 28, 2023 with English translation (5 pages).
German-language Written Opinion (PCT/ISA/237) issued in PCT Application No. PCT/EP2023/066596 dated Aug. 28, 2023 with English translation (8 pages).
German-language Search Report issued in German Application No. 10 2022 116 920.0 dated Mar. 6, 2023 with partial English translation (12 pages).

* cited by examiner

ILLUMINATION APPARATUS FOR A MOTOR VEHICLE

BACKGROUND AND SUMMARY

The invention relates to an illumination apparatus for a motor vehicle.

It is known from the prior art to integrate a surface light emission function or a corresponding surface illumination into an illumination apparatus for a motor vehicle. The surface illumination generates a surface light emission along an outer lens of the illumination apparatus. It is desirable here to integrate the surface illumination compactly in the illumination apparatus and at the same time guide its light efficiently out of the outer lens.

It is the object of the invention to provide an illumination apparatus for a motor vehicle in which a surface light emission function is integrated in a simple manner.

This object is achieved by the illumination apparatus according to the claimed invention.

The illumination apparatus according to the invention is provided for a motor vehicle, wherein the motor vehicle is preferably a passenger car, but may also be a truck. The illumination apparatus comprises a housing, which is covered by an outer lens, wherein the illumination apparatus includes a surface light emission function in order to bring about surface light emission in a specified region of the outer lens in a top view of the outer lens from outside.

For the surface light emission function a light-emitting device is provided at least in sections at the periphery of the outer lens. The outer lens furthermore comprises for the surface light emission function a light-transmissive light-guiding layer, which preferably extends along the entire surface extent of the outer lens and which is preferably non-light-scattering. Here and below, the term "light-transmissive" is understood to mean a transmittance for light of greater than zero. The transmittance is preferably, however, 50% or more, with particular preference 90% or more, or 95% or more. The light-emitting device radiates light during operation into the light-guiding layer along the surface extent of the light-guiding layer, wherein the light-guiding layer passes on the incoming light along the surface extent.

Moreover, a light deflection device is provided in the specified region of the outer lens in order to deflect passed-on light in the light-guiding layer in a manner such that it exits via the outer lens and thereby generates the surface light emission in the specified region of the outer lens.

The illumination apparatus according to embodiments of the invention has the advantage that a surface light emission function can be realized simply and compactly by integrating a light-guiding layer and a light deflection device in the outer lens.

In a preferred embodiment of the illumination apparatus according to the invention, the light deflection device comprises a light coupling-out structure, for example in the form of corresponding coupling-out optical units or prisms. The light coupling-out structure is preferably provided on the side of the light-guiding layer facing the housing. Nevertheless, the light coupling-out structure may also be provided on the other side of the light-guiding layer. Moreover, the light coupling-out structure is preferably an integral component of the light-guiding layer. The light deflection device may be formed exclusively by the light coupling-out structure. Nevertheless, the light deflection device may also be realized in a different way in partial regions of the outer lens.

In a further preferred embodiment, the light deflection device comprises a light coupling-out lacquer, which is applied preferably to the side of the light-guiding layer facing away from the housing but may also be provided on the other side of the light-guiding layer. The light deflection device may be formed exclusively by the light coupling-out lacquer. Nevertheless, the light deflection device can also be realized in a different way in partial regions of the outer lens, for example as the light coupling-out structure described above.

In a further preferred variant, the light deflection device comprises a reflection layer, which is preferably provided on the side of the light-guiding layer facing the housing. The light deflection device may be formed exclusively by the reflection layer. Nevertheless, the light deflection device may also be realized in a different way in partial regions of the outer lens, for example in the form of the light coupling-out lacquer described above and/or the light coupling-out structure described above.

In a further preferred embodiment, the light deflection device comprises light-scattering particles in the light-guiding layer. The light-guiding layer, which in other embodiments generally has a non-light-scattering design, in this embodiment is now light-scattering. The light deflection device may be formed exclusively by light-scattering particles in the light-guiding layer. Nevertheless, the light deflection device may also be realized in a different way in partial regions of the outer lens, in particular as the reflection layer described above and/or the light coupling-out lacquer described above and/or the light coupling-out structure described above.

In a further preferred embodiment of the illumination apparatus, the outer lens comprises in the specified region a light-transmissive film, wherein an opaque layer is provided at least in sections on one side of the film, with the opaque layer being used to produce a light-opaque structure in the specified region. In other words, the outer lens in the specified region is partially light transmissive and partially light-opaque. In this way, it is possible to attain appealing design effects for example in the form of patterns in the specified region.

In a further preferred embodiment, a reflective layer is provided at least in sections on the opaque layer, with the reflective layer reflecting light passed on in the light-guiding layer. The reflective layer is preferably a different layer than the reflection layer described above. Nevertheless, the reflective layer may coincide with the reflection layer. The reflective layer ensures efficient propagation of the light in the light-guiding layer.

In a further preferred variant, the (entire) light-transmissive film is non-light-scattering. Nevertheless, the (entire) light-transmissive film can also have a light-scattering design. It is likewise possible for the light-transmissive film to be light-scattering in some sections and non-light-scattering in others.

In a further preferred embodiment, the outer lens comprises in addition to the light-guiding layer a light-transmissive, preferably non-light-scattering outer layer on the outer side of the outer lens facing away from the housing, wherein the outer layer preferably comprises a protective film, which protects the outer surface of the outer lens. With this variant, a robust construction of the outer lens is ensured.

In an alternative embodiment, the light-guiding layer is a light-transmissive and preferably non-light-scattering outer layer on the outer side of the outer lens facing away from the housing, wherein the outer layer preferably comprises a protective film, which protects the outer surface of the outer lens. With this variant, the construction of the outer lens becomes particularly compact.

In a further preferred embodiment, the outer lens is a plastics component, which is preferably produced at least in part by way of injection molding. For the case that the outer lens contains the light-transmissive film described above, the light-guiding layer and possibly the outer layer (where present) are molded onto this film as part of the manufacturing of the outer lens.

In a further, particularly preferred embodiment, the outer lens comprises in addition to the specified region a second region, which does not overlap with the specified region when viewing the outer lens from the top and which is light-transmissive and does not contain a light-deflection device. Here, one or more light emission units which emit light through the outer lens are provided in the housing behind the second region. Consequently, it is possible with this variant to also realize, in addition to the surface light emission function, further light functions by way of the light-emitting unit or the light-emitting units.

In a preferred refinement of the variant just described, the illumination apparatus is a front headlight, wherein the light-emitting unit which emits light directly through the outer lens or the light-emitting units emitting light directly through the outer lens are provided at least for generating the low beam and main beam. Nevertheless, the light-emitting units may also assume other or further light functions, such as daytime running light or the function of a direction indicator.

In a further preferred embodiment, one or more radiation units for emitting other radiation than light via the outer lens are provided in the housing behind the specified region, in particular one or more radar devices, which are used for example for driver assistance functions. In this embodiment, use is made of the knowledge that the construction of the outer lens according to embodiments of the invention can ensure the transmissivity for specific radiation in the non-visible range.

In addition to the illumination apparatus according to embodiments of the invention, the invention relates to a motor vehicle which comprises one or more of the illumination apparatuses according to embodiments of the invention.

Exemplary embodiments of the invention will be described in detail below with reference to the attached figures.

DETAILED DESCRIPTION OF THE DRAWINGS

Figure 1:
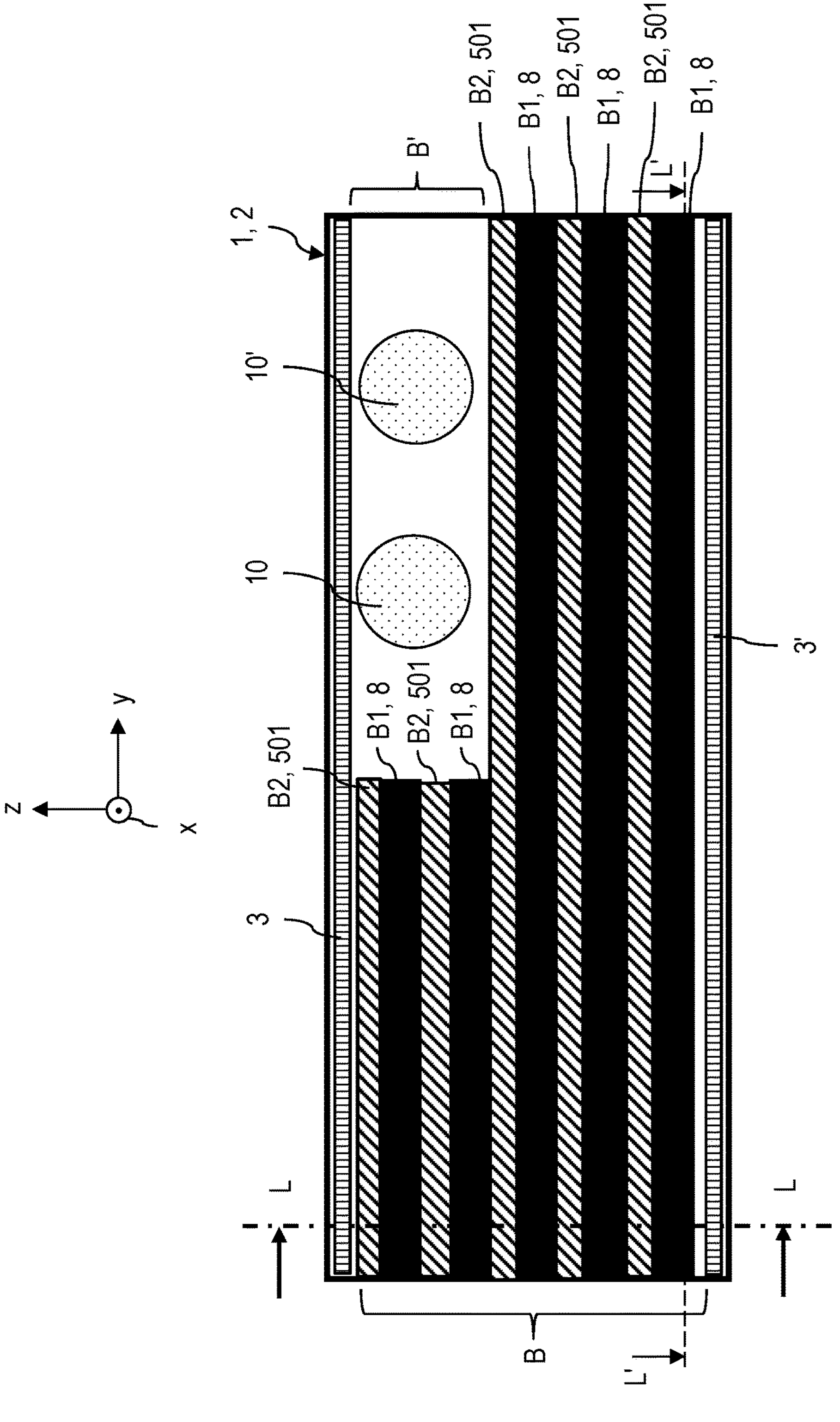
FIG. 1 shows a top view of a first embodiment of an illumination apparatus according to the invention in the form of a left-hand motor vehicle headlight.

Embodiments of the invention will be described below on the basis of an illumination apparatus in the form of a motor vehicle headlight. FIG. 1 shows a Cartesian coordinate system, wherein the x-axis corresponds to the driving direction of the motor vehicle, the y-axis corresponds to the transverse direction of the motor vehicle, and the z-axis corresponds to the height direction of the motor vehicle.

FIG. 1 shows the motor vehicle headlight in a top view from the front. The headlight is delimited to the front by an outer lens 1, by which a housing 2 of the headlight is covered. The headlight illustrated is the left-hand headlight of the motor vehicle, which comprises light-emitting units 10 and 10', which emit light directly through the outer lens 1. In a manner known per se, these light-emitting units serve for generating the low beam distribution and the main beam of the headlight. The outer lens extends in the transverse direction y from the left-hand periphery of the motor vehicle up to its center. There, a corresponding outer lens for the right-hand headlight adjoins it, which extends to the right-hand periphery of the motor vehicle.

The light-emitting units 10, 10' are located in a light-transmissive region B' of the outer lens, wherein this region will also be referred to below as the second region. The region B' is shown in white in FIG. 1. In addition to the second region B', the outer lens 1 comprises the region B, which will also be referred to below as the specified region. In this region, a surface illumination is realized which extends in the lower section along the entire extent of the outer lens in the transverse direction of the motor vehicle and extends in the upper section up to the start of the second region B'.

The surface illumination is supplied by a light-emitting device in the form of an upper LED strip 3 and a lower LED strip 3'. In the specified region B, of the outer lens first opaque strips B1 can be seen and, lying therebetween, second strips B2 that emit light during the operation of the surface illumination. In this way, a radiator grille is simulated by way of the surface illumination. The first strips B1 correspond to the opaque layer 8, which is described further below, whereas the second strips B2 represent the light coupling-out structure 501 described further below. The surface light emission function according to the illustration in FIG. 1 is achieved by all the embodiments described below.

Figure 2:
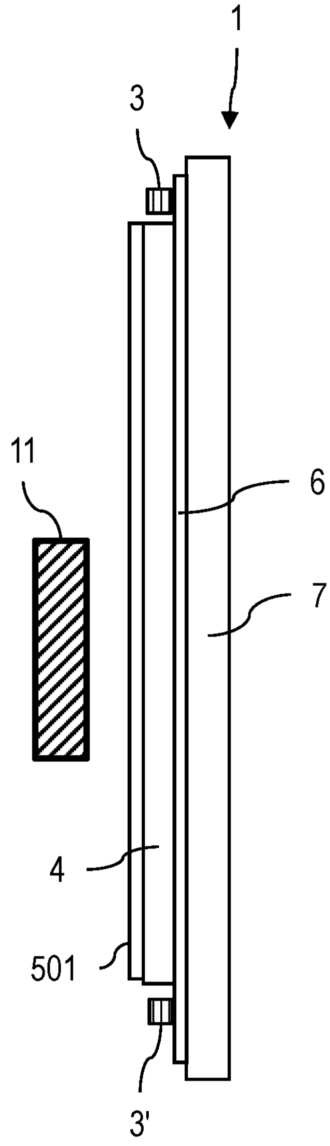
FIG. 2 shows a sectional view along the line L-L of FIG. 1.

The headlight of FIG. 1 is characterized by a special layer structure of the outer lens 1, through which light guidance for realizing the surface light emission function is made possible. FIG. 2 shows a section along the line L-L of FIG. 1, which shows the layer structure of the outer lens 1. The outer lens comprises a light-transmissive light-guiding layer 4, on which a light coupling-out structure 501, for example in the form of prisms, is provided on the side facing the housing interior. The light from the LED light strips 3, 3' is radiated into the light-guiding layer. This light propagates along the light-guiding layer and is coupled out successively during its propagation in the light-guiding layer via the light coupling-out structure 501 in the direction of the outer region outside the housing 2.

The light-guiding layer 4 is adjoined on its side facing away from the housing interior by a light-transmissive film 6 as a further layer. Located on the side of the film 6 facing the housing interior is a structured opaque print, on which in turn a reflective print is applied. The prints cannot be seen in FIG. 2 but are shown in the figures described further below and provided there with the reference sign 8 for the opaque print and with the reference sign 9 for the reflective print. The opaque print 8 corresponds to the first strip B1 from FIG. 1. There is no opaque print on the second strip B2, with the result that the light coupling-out structure 501 is exposed there. The film 6 is adjoined on its side facing away from the housing interior by a light-transmissive outer layer 7, which serves for protecting the outer lens. A protective film 7*a* is preferably located on this outer layer, as can be seen from FIGS. 3 to 7 described further below.

When the LED strips 3 and 3' are switched on, it is ensured that the light is coupled out via the light coupling-out structure 501 and exits from the outer lens along the second strips B2, on which there is no opaque print. By contrast, the first strips B1 remain black. This therefore gives the impression of a radiator grille. FIG. 2 furthermore shows a schematically indicated radar device 11, which is located behind the surface illumination. The layer construction of the outer lens without height jumps, deep structures, and light gaps ensures that the outer lens is transparent for the radar radiation from the radar device 11. The radar device is utilized for driver assistance functions, such as the distance measurement from other vehicles.

Figure 3:
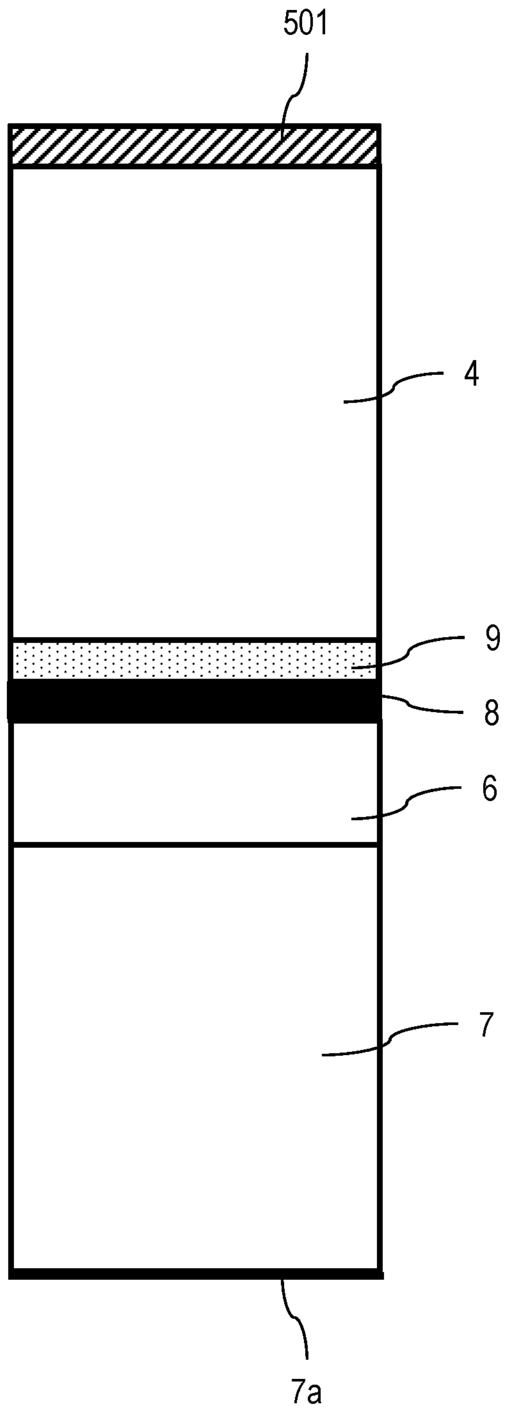
FIG. 3 shows a sectional view along the line L'-L' of FIG. 1, which shows in a detail the construction of the outer lens according to the first embodiment.

FIG. 3 shows in a detail a first section along the line L'-L' of FIG. 1, wherein the dimensions of the layers shown in FIG. 3 are not to scale. The section chosen for FIG. 3 and also for the further figures lies within a first strip B1, which means that regions with an opaque print 8 and a reflective print 9 are shown. When choosing the section within a second strip B2, there are no prints 8 and 9 in FIG. 3 and also in all further figures (except for FIG. 8). FIG. 3 again shows in detail the layer construction from FIG. 2. In particular, it shows that the light-guiding layer 4 has on one side the light coupling-out structure 501, and that the light-guiding layer is adjoined in the direction of the exterior of the housing by the film 6, on which in turn the opaque layer 8 with corresponding reflection layer 9 is provided. The reflection layer 9 ensures that light passed on in the light-guiding layer 4 is reflected and as a result remains in the light-guiding layer. The film 6 is adjoined in the direction of the exterior of the housing by the outer layer 7 with a protective film 7*a*, which is located thereon. In the embodiment of FIG. 3, the light-guiding layer 4, the film 6, and the outer layer 7 are non-light-scattering.

Figure 4:
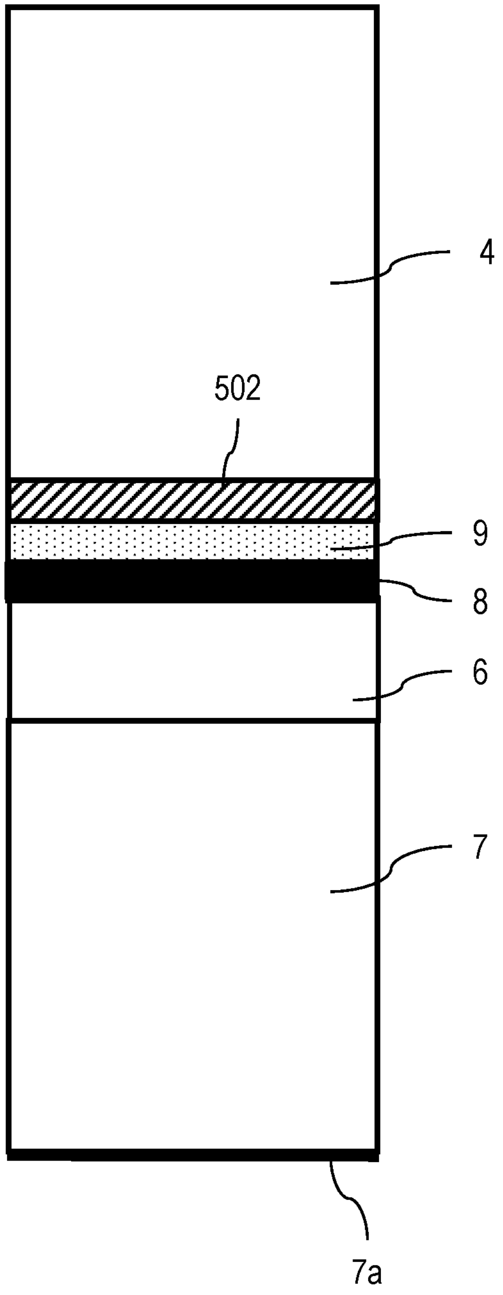
FIG. 4 shows a sectional view analogously to FIG. 3, which shows the construction of the outer lens according to a second embodiment.

FIG. 4 shows a modified construction of the outer lens 1 according to a second embodiment of the invention. The embodiment in FIG. 4 differs from FIG. 3 in that, rather than a light coupling-out structure 501, a light coupling-out lacquer 502 is used, which is now applied to the side of the light-guiding layer 4 which is adjacent to the film 6 and its prints 8 and 9. In regions of the outer lens in which the prints 8, 9 are not present, the light coupling-out lacquer brings about the coupling-out of light out of the light-guiding layer 4.

Figure 5:
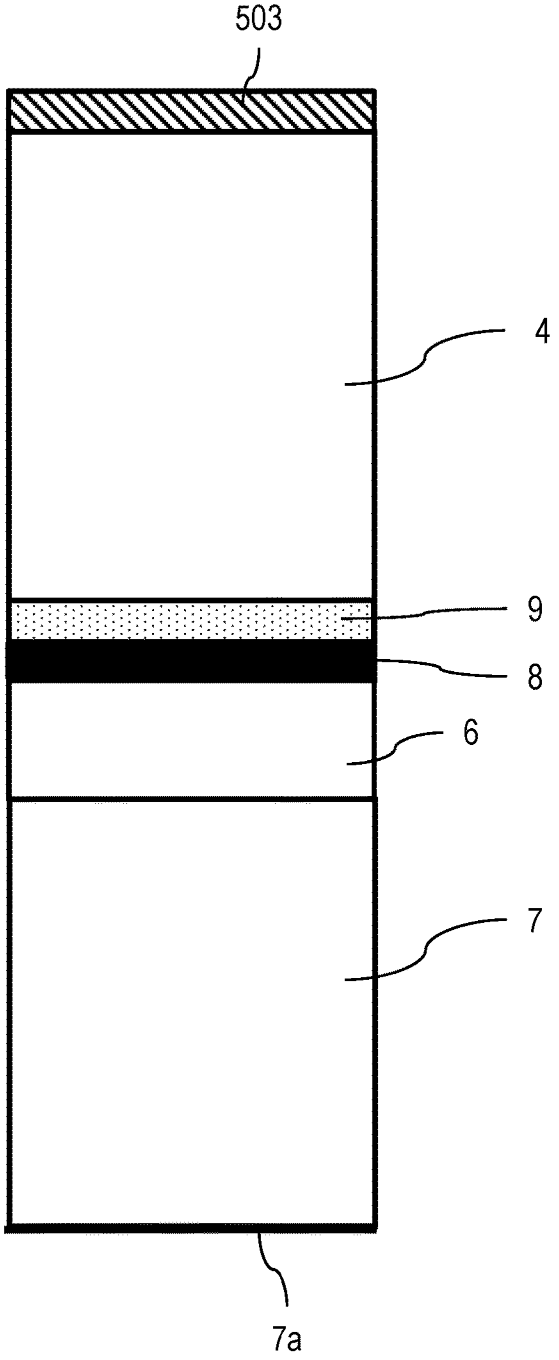
FIG. 5 shows a sectional view analogously to FIG. 3, which shows the construction of the outer lens according to a third embodiment.

FIG. 5 shows the construction of an outer lens according to a third embodiment of the invention. The construction substantially corresponds to FIG. 3, but rather than a light coupling-out structure 501 now a reflection layer 503 is used, which deflects light rays accordingly and in this way guides them analogously to the light coupling-out structure 501 to the outside out of the outer lens.

Figure 6:
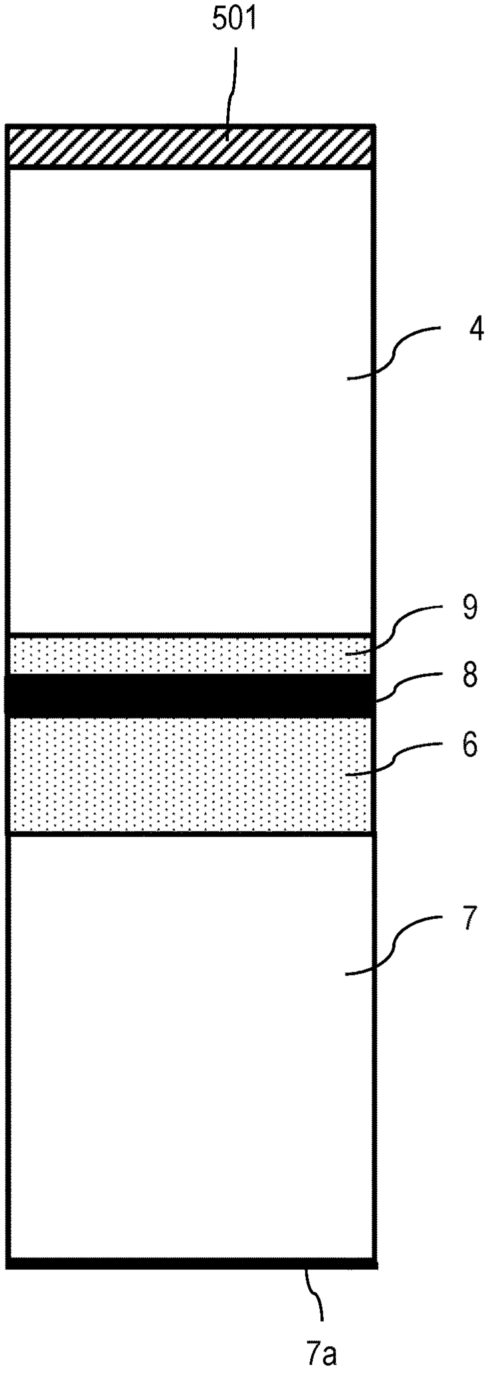
FIG. 6 shows a sectional view analogously to FIG. 3, which shows the construction of the outer lens according to a fourth embodiment.

FIG. 6 shows a construction of the outer lens according to a fourth embodiment. This variant differs from the embodiment in FIG. 3 in that, rather than a non-light-scattering film 6, a light-scattering film is used. The light exiting from the outer lens is thus scattered light, as a result of which a particularly appealing surface light emission function is achieved. However, it must be noted here that the film 6 in the section of the specified region B, which is located in FIG. 1 below the second region B', furthermore has a non-light-scattering design in order for scattered light to not interfere with the light distribution generated via the light-emitting units 10 and 10'.

Figure 7:
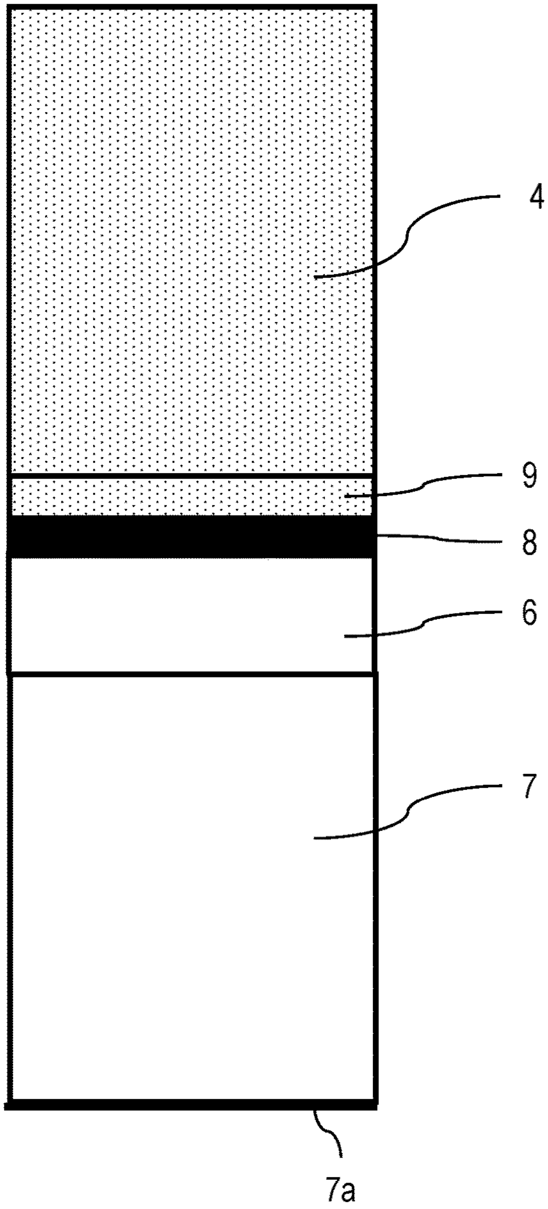
FIG. 7 shows a sectional view analogously to FIG. 3, which shows the construction of the outer lens according to a fifth embodiment.

FIG. 7 shows a layer construction according to a fifth embodiment of the invention. This embodiment differs from the embodiments in FIG. 3 to FIG. 6 in that, rather than a light coupling-out structure 501 or a light coupling-out lacquer 502 or a reflection layer 503, a light-guiding layer 4 with scattering particles is used to couple the light out of the light-guiding layer using these particles. The light-scattering particles and also the light coupling-out structure 501, the light coupling-out lacquer 502, and the reflection layer 503 are variants of a light deflection device within the meaning of the claims.

Figure 8:
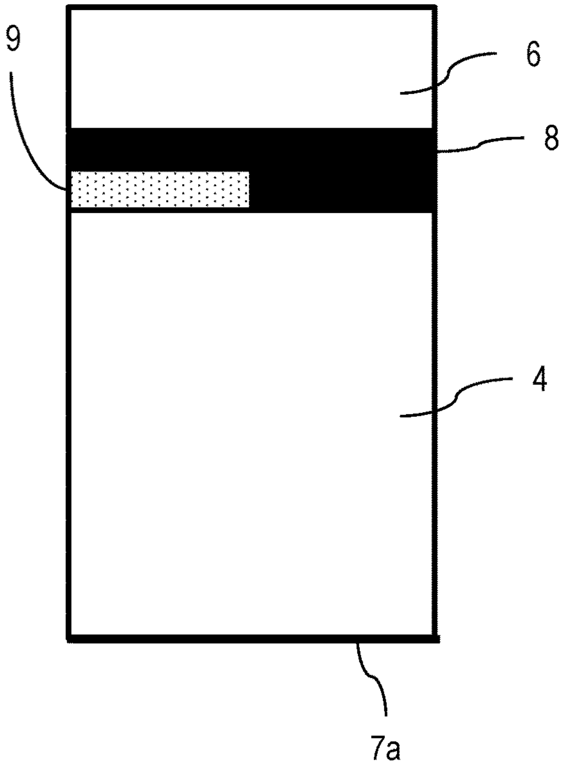
FIG. 8 shows a sectional view analogously to FIG. 3, which shows the construction of the outer lens according to a sixth embodiment.

FIG. 8 shows the layer construction of the outer lens according to a sixth variant of the invention. The right-hand part shows the layer construction along a first strip B1 from FIG. 1 (without reflective print 9), and the right-hand part shows the layer construction along a second strip B2 from FIG. 1 (with a reflective print 9). According to FIG. 8, the outer layer 7 and the light-guiding layer 4 no longer form separate components. In other words, the outer layer 7 is now the light-guiding layer 4, which is adjoined in the direction of the housing interior by the film 6 with the opaque print 8 and possibly the reflective print 9, wherein these prints are now located on the side of the film 6 facing away from the housing. The reflective print 9 has in the embodiment of FIG. 8 the function of a light deflection device in the form of the reflection layer 503 from FIG. 5.

The construction of the outer lens in the specified region B of FIG. 1 in which the surface light emission function or surface illumination is realized was described above. In region B', the outer lens is constructed such that the opaque layer 8 and the reflective layer 9 and the corresponding light deflection device are omitted, which means that the light which is guided along the light-guiding layer in the region B' is not coupled out and consequently does not interact with the light radiation from the light units 10, 10'.

The embodiments described above of the outer lens are a plastics component, which is produced partly by way of injection molding and which contains for example polycarbonate as the main constituent part. The production of the component begins with the film 6, on which the prints 8 and 9 are already located. Using injection molding, the light-guiding layer 4 and the outer layer 7 (if present) are then molded onto the film.

The embodiments of the invention described above have a number of advantages. In particular, a compact surface light emission function is achieved in a simple manner by integrating a light-guiding layer into the outer lens of a motor vehicle illumination apparatus. Using an opaque layer, the surface illumination can be appropriately structured and an appealing design of the surface illumination can thus be made possible. Moreover, the construction of the outer lens ensures that the outer lens also continues to be transparent for radar rays from a radar device.

LIST OF REFERENCE SIGNS

1 Outer lens
2 Housing

3, 3' Light-emitting device
4 Light-guiding layer
501 Light coupling-out structure (light deflection device)
502 Light coupling-out lacquer (light deflection device)
503 Reflection layer (light deflection device)
6 Light-transmissive film
7 Outer layer
7*a* Protective film
8 Opaque layer
9 Reflective layer
10, 10' Light-emitting units emitting light directly through the outer lens
11 Radar device
B Specified region
B Second region
B1 First strips
B2 Second strips
x Driving direction of the motor vehicle
y Transverse direction of the motor vehicle
z Height direction of the motor vehicle

The invention claimed is:

1. An illumination apparatus for a motor vehicle, the illumination device comprising:

a housing, which is covered by an outer lens, wherein the illumination apparatus includes a surface light emission function in order to bring about surface light emission in a specified region of the outer lens in a top view of the outer lens from outside;

a light-emitting device for the surface light emission function, wherein the light-emitting device extends at least in sections along a periphery of the outer lens and outside of the specified region of the outer lens, the outer lens comprises a light-transmissive light-guiding layer, the light-emitting device, during operation, radiates light into a surface extent of the light-guiding layer in a direction perpendicular to the surface extent of the light-guiding layer, and radiates the light along an entirety of the surface extent of the light-guiding layer in the direction perpendicular to the surface extent of the light-guiding layer, and the light-guiding layer passes on the incoming light along the surface extent; and a light deflection device, wherein the light deflection device is provided in the specified region of the outer lens in order to deflect passed-on light in the light-guiding layer such that the passed-on light exits via the outer lens and thereby generates the surface light emission in the specified region of the outer lens.

2. The illumination apparatus according to claim 1, wherein the light deflection device comprises a light coupling-out structure.

3. The illumination apparatus according to claim 2, wherein the light coupling-out structure is provided on a side of a light-guiding layer facing the housing.

4. The illumination apparatus according to claim 1, wherein the light deflection device comprises a light coupling-out lacquer.

5. The illumination apparatus according to claim 4, wherein the light coupling-out lacquer is applied on a side of the light-guiding layer facing away from the housing.

6. The illumination apparatus according to claim 1, wherein the light deflection device comprises a reflection layer.

7. The illumination apparatus according to claim 6, wherein the reflection layer is provided on a side of a light-guiding layer facing the housing.

8. The illumination apparatus according to claim 1, wherein the light deflection device comprises light-scattering particles in the light-guiding layer.

9. The illumination apparatus according to claim 1, wherein:

the outer lens comprises, in the specified region, a light-transmissive film, and an opaque layer is provided on a side of the film at least in sections, by way of which opaque layer a light-opaque structure is generated in the specified region.

10. The illumination apparatus according to claim 9, wherein a reflective layer is provided at least in sections on the opaque layer, which reflective layer reflects light passed on in the light-guiding layer.

11. The illumination apparatus according to claim 9, wherein:

the light-transmissive film is non-light-scattering or light-scattering, or the light-transmissive film is non-light-scattering in some sections and light-scattering in other sections.

12. The illumination apparatus according to claim 1, wherein:

the outer lens comprises, in addition to the light-guiding layer, a light-transmissive outer layer on an outer side of the outer lens facing away from the housing, and the outer layer comprises a protective film, which protects an outer surface of the outer lens.

13. The illumination apparatus according to claim 1, wherein:

the light-guiding layer comprises a light-transmissive outer layer on an outer side of the outer lens facing away from the housing, and the outer layer comprises a protective film, which protects an outer surface of the outer lens.

14. The illumination apparatus according to claim 1, wherein the outer lens is a plastics component which is produced at least partially by way of injection molding.

15. The illumination apparatus according to claim 1, wherein:

the outer lens comprises a second region, which does not overlap with the specified region when viewing the outer lens from the top, which is light-transmissive, and which does not contain any light deflection devices, and one or more light-emitting units which emit light directly through the outer lens are provided in the housing behind the second region.

16. The illumination apparatus according to claim 15, wherein:

the illumination apparatus is a front headlight, and the one or more light-emitting units emitting light directly through the outer lens are provided at least for generating a low beam and a main beam.

17. The illumination apparatus according to claim 1, wherein one or more radiation units for emitting radiation other than light via the outer lens are provided in the housing behind the specified region.

18. The illumination apparatus according to claim 1, wherein one or more radar devices for emitting radiation other than light via the outer lens are provided in the housing behind the specified region.

19. A motor vehicle comprising the illumination apparatus according to claim 1.

20. The illumination apparatus according to claim 1, wherein the light-emitting device is an LED strip.

* * * * *